(12) United States Patent
Maxted et al.

(10) Patent No.: US 11,794,299 B2
(45) Date of Patent: Oct. 24, 2023

(54) CALIBRATION METHOD AND METHOD OF OBTAINING WORKPIECE INFORMATION

(71) Applicant: RENISHAW PLC, Wotton-under-Edge (GB)

(72) Inventors: Paul Maxted, Bristol (GB); James Arthur Hartley, Tetbury (GB)

(73) Assignee: RENISHAW PLC, Wotton-under-Edge (GB)

( * ) Notice: Subject to any disclaimer, the term of this patent is extended or adjusted under 35 U.S.C. 154(b) by 151 days.

(21) Appl. No.: 17/441,071

(22) PCT Filed: Mar. 11, 2020

(86) PCT No.: PCT/GB2020/050583
§ 371 (c)(1),
(2) Date: Sep. 20, 2021

(87) PCT Pub. No.: WO2020/193944
PCT Pub. Date: Oct. 1, 2020

(65) Prior Publication Data
US 2022/0184765 A1    Jun. 16, 2022

(30) Foreign Application Priority Data
Mar. 27, 2019    (EP) .................................... 19165429

(51) Int. Cl.
*B23Q 15/12*    (2006.01)
*G01B 5/012*    (2006.01)
(Continued)

(52) U.S. Cl.
CPC ............. *B23Q 15/12* (2013.01); *G01B 5/012* (2013.01); *G01B 5/20* (2013.01); *G01B 5/28* (2013.01)

(58) Field of Classification Search
None
See application file for complete search history.

(56) References Cited

U.S. PATENT DOCUMENTS 10,802,462 B2 * 10/2020 Fujii ..................... G05B 19/401
2004/0183789 A1 * 9/2004 Schopf ................... G01B 5/012
345/173

(Continued)

FOREIGN PATENT DOCUMENTS

DE    19715634 C1    11/1998
WO    2003/074968 A1    9/2003
(Continued)

OTHER PUBLICATIONS

Jun. 9, 2020 International Search Report issued in International Patent Application No. PCT/GB2020/050583.

(Continued)

*Primary Examiner* — Christopher W Fulton
(74) *Attorney, Agent, or Firm* — Oliff PLC (57) ABSTRACT

A method including: a) causing a tool mounted on a machine tool to work on a workpiece, and at least one sensor, which is configured to measure one or more aspects of the tool and/or machine tool, collecting sensor data during said working; b) a measurement device inspecting the part of the workpiece that was worked on at step a) to obtain measurement data; and c) calculating sensor-to-workpiece data calibration information from the sensor data and the measurement data.

16 Claims, 4 Drawing Sheets (51) Int. Cl.
  *G01B 5/20* (2006.01)
  *G01B 5/28* (2006.01)

(56) References Cited

U.S. PATENT DOCUMENTS

| | | | |
|---|---|---|---|
| 2008/0105094 A1 | 5/2008 | McMurtry et al. | |
| 2013/0116817 A1 | 5/2013 | Faughnan, Jr. et al. | |
| 2020/0356068 A1* | 11/2020 | O'Hare | G06F 3/0481 |
| 2021/0001446 A1* | 1/2021 | Badrawy | G05B 19/4083 |
| 2022/0178679 A1* | 6/2022 | Suzuki | G01B 21/042 |
| 2023/0008247 A1* | 1/2023 | Miyara | G05B 19/406 |

FOREIGN PATENT DOCUMENTS

| | | | | |
|---|---|---|---|---|
| WO | WO-2007028964 A1 * | 3/2007 | | G01B 21/047 |
| WO | 2020/151960 A1 | 7/2020 | | |
| WO | WO-2021205318 A1 * | 10/2021 | | B23Q 15/12 |

OTHER PUBLICATIONS

Jun. 9, 2020 Written Opinion issued in International Patent Application No. PCT/GB2020/050583.

Sep. 18, 2019 Search Report issued in European Patent Application No. 19165429.2.

Siamak Mirifar et al. "First Steps Through Intelligent Grinding Using Machine Learning Via Integrated Acoustic Emission Sensors," Journal of Manufacturing and Materials Processing, vol. 4, No. 35, pp. 1-15 (2020).

"Cutting Force Measurement Directly On the Tool," Spike Expert & EasyInline, PROMICRON Wireless Solutions, 2 pages, <URL: www.pro-micron.de>.

YouTube Video, "Sandvik Coromant Silent Tools Plus Intelligent Tooling At Mazak," <Url: https://www.youtube.com/watch?v=_8izfcfOGtl&feature=youtu.be>, Sep. 17, 2018.

* cited by examiner

CALIBRATION METHOD AND METHOD OF OBTAINING WORKPIECE INFORMATION

The present invention relates to obtaining calibration information for a sensor, such that information about a workpiece worked on by a tool mounted on a machine tool, can be inferred from data obtained by the sensor which is configured to monitor aspects of the machine and/or tool during working of the tool.

It is known to embed sensors in the body of a tool, in close proximity to the tool body, tool insert or cutting edge; e.g. for monitoring properties/aspects of the tool or cutting process such as deflection, temperature, load and/or vibration during machining of a workpiece by the tool. Such tools are known in industry as "intelligent tools". It is also known to embed sensors in parts of the machine tool, such as the spindle, for monitoring aspects of the machine tool during a machining operation. The output of such sensors can be monitored in order to aid tool set-up, assess whether there are any problems with the machining operation and to take action (for instance stopping the machining operation if the sensor outputs indicate an adverse situation) and also to try to provide some generic prediction of the surface finish of the workpiece.

The present invention relates to a method of using such data in a new way, so that measurement data about the part (e.g. surface) of the workpiece worked on can be inferred from such sensors. In particular, as described in more detail below, the method can comprise determining calibration information, which, for example, correlates measurement data about a part of a workpiece worked on by a tool (the measurement data obtained by a measurement device inspecting the part of the workpiece), with sensor data obtained whilst that part of the workpiece was being worked on by the tool. Such calibration information can then be used subsequently to infer measurement data about a part of the workpiece worked on, from such sensor data obtained during other (e.g. subsequent) machining steps/operations.

According to a first aspect of the invention, there is provided a method comprising: a) causing a tool mounted on a machine tool to work on (in other words "machine") a workpiece and, at least one sensor, which is configured to measure (e.g. monitor) one or more aspects/properties of the tool and/or machine tool, collecting sensor data during said working ("machining"); b) a measurement device inspecting the part of the workpiece that was worked on ("machined") at step a) to obtain measurement data; and c) calculating sensor-to-workpiece data calibration information from the sensor data and the measurement data.

A benefit of the present invention is that the sensor-to-workpiece data calibration information ("calibration information") can be used to (automatically) infer information (e.g. measurement data) about the part of a workpiece worked (e.g. machined) at a different (e.g. subsequent or earlier) time, from sensor data obtained during such working/machining. Accordingly, in other words, step c) could be said to be determining "sensor data to workpiece data conversion information" (instead of "sensor-to-workpiece data calibration information"). Optionally, the sensor-to-workpiece data calibration information could simply be referred to as "sensor-calibration information". This can provide various different advantages. For instance, this can significantly reduce production cycle times. For example, rather than directly measuring, with a dedicated measurement tool such as a contact measurement probe, all relevant aspects of a workpiece which has been worked on by an intelligent tool, with the present invention, it is possible to use the sensor-to-workpiece data calibration information to infer, with a high level of confidence, information (e.g. measurement data) about the workpiece from sensor data which was obtained by a sensor configured to measure (e.g. monitor) one or more aspects of the tool and/or machine tool during the working of the workpiece. In other words, the inferred information (e.g. measurement data) about the workpiece from the sensor data can be used/output as if it were actual information (e.g. measurement data) obtained by inspecting the part of the workpiece worked on with a dedicated measurement probe. This could reap significant time saving, especially if a series of nominally identical artefacts are to be made. For instance, information for a whole series of nominally identical workpieces can be inferred from sensor data obtained during their working/machining, by using the sensor-to-workpiece data calibration information which was obtained by measuring only some, or even only one, workpiece(s).

Furthermore, the sensor-to-workpiece data calibration information can be used to infer information about parts of a workpiece which are difficult or impossible to directly measure using a dedicated measurement device. For instance, it might be difficult to accurately directly measure a feature which is located toward the distal end of a long bore. For instance, some bores can be many metres deep (e.g. at least one 1 m (metre), for example at least 2 m, and for instance at least 3 m) and access toward the bottom end of the bore can be difficult. Accordingly, the present invention can be used to infer measurement information about such features from the sensor data obtained during the working of such features.

In other words, the method could comprise using the sensor-to-workpiece data calibration information to infer information (e.g. measurement data) about a different part of the workpiece from sensor data obtained (by at least one sensor which is configured to measure one or more aspects of the tool and/or machine tool) during the working of said different part. Said different part could be located toward the bottom end of a hole, e.g. located toward the closed end of a bore. The hole could be at least 2 m long (or "deep"), for example, at least 3 m long. The method could comprise, using the sensor-to-workpiece data calibration information to infer information about a part of the hole located at least 1 m from a first end of the hole (e.g. the open end, or the end from which the hole is machined), optionally at least 1.5 m from the first end of the hole, for example at least 2 m or even 3 m from the first end of the hole.

The tool's length (e.g. the distance between i) the point the tool is held in a tool holder and ii) the tool insert) could be at least 1 m, for example at least 2 m, for instance at least 3 m. The method can comprise inferring information (e.g. measurement data) about a workpiece (e.g. the same, or a nominally identical, workpiece), from the sensor-to-workpiece data calibration information and sensor data relating to one or more aspects/properties of a tool and/or machine tool collected during the working of the workpiece (by at least one sensor which is configured to measure one or more aspects of the tool and/or machine tool). As mentioned above, the invention can be particularly advantageous when the workpiece is worked on ("machined") by a long tool, because it can be difficult for a measurement device to access features formed by long tools.

As will be understood, steps c) could calculate the sensor-to-workpiece data calibration information from multiple sets of sensor and measurement data (e.g. from multiple different performances or repeats of steps a) and b)) which may or may not be obtained from the same workpiece. For example, the calibration information may be obtained from sensor and measurement data obtained from (e.g. the same) machining operations performed multiple times on the same workpiece, and/or from (e.g. the same) machining operations performed on different workpieces.

As will be understood, the method can comprise initially performing steps a) to c), then performing subsequent working (machining) of a workpiece, and then using the sensor-to-workpiece data calibration information and sensor data relating to one or more aspects/properties of a tool and/or machine tool collected (by at least one sensor which is configured to measure one or more aspects of the tool and/or machine tool) during the subsequent working of the workpiece to infer information about at least one part of the workpiece subsequently worked. Optionally, the method comprises performing multiple machining operations on one workpiece (or on a plurality of nominally workpieces), then subsequently measuring just one part (or just some of the parts) which has been machined (or measuring just one of the workpieces for example) and determining the calibration information therefrom, and then using the calibration information to infer information about the other parts of the workpiece (or about the other workpieces) which have already been machined. Accordingly, for example, the calibration information does not necessarily have to be determined before the part for which information is to be inferred is worked on/machined.

The tool, machine tool and/or sensor used during the working of the workpiece for which information (e.g. measurement data) is inferred, can be the same tool, machine tool and/or sensor as that used during step a). Of course, it could be assumed that the same sensor-to-workpiece data calibration information can be used to infer information (e.g. measurement data) from sensor data obtained by a nominally identical sensor, for a workpiece worked on by a nominally identical tool and machine tool. As will be understood, nominally identical sensors, tools and machine tools can be those sensors, tools and machine tools having substantially identical specification, for example configured to have the same performance/function and formed from substantially the same components. For example, nominally identical can mean that they originate from the same manufacturer and have the same model/part number. Accordingly, this can avoid the need to repeat steps a), b) and c) if, for instance, the tool is replaced with a (nominally) identical tool. Nevertheless, it can be preferred that steps a), b) and c) are repeated even if the tool is replaced with a (nominally) identical tool, and/or if the tool or a nominally identical tool is to be used to machine nominally identical workpieces on a different machine tool. Repeating steps a) to c) in such instances can help to provide the most accurate inferred information (e.g. measurement data). Accordingly, the method can comprise repeating steps a) to c) in the event the tool or a part thereof (e.g. the tool insert) is replaced.

Optionally, steps a) to c) are repeated, even if the tool has not been changed/replaced. For example, steps a) to c) could be repeated at regular and/or predetermined intervals. For instance, steps a) to c) could be repeated after a predetermined amount of time (e.g. machining time with the tool) and/or after a predetermined number of machining operations have been performed with the tool.

Optionally, steps a) to c) are repeated if there is a detected significant change in environmental factors. For example, the method can comprise repeating steps a) to c) if the temperature of the operating environment changes by more than a predetermined threshold.

The workpiece of step a) can be one of a series of nominally identical workpieces to be worked (e.g. so as to form a series of nominally identical artefacts). Accordingly, for at least one further workpiece in said series, information about it can be inferred from the sensor-to-workpiece data calibration information, and sensor data obtained during its working. For example, the method could further comprise working a series of nominally identical workpieces to form a series of nominally identical artefacts (e.g. which are nominally identical to the workpiece/artefact of step a)). For at least some of the workpieces, information (e.g. measurement data) could be inferred from the sensor-to-workpiece data calibration information, and sensor data relating to one or more aspects/properties of a tool and/or machine tool obtained (by at least one sensor which is configured to measure one or more aspects of the tool and/or machine tool) during the working of a workpiece.

For instance, the method could comprise: d) working the same or a nominally identical workpiece as that of step a). Such working could be done using the same or a nominally identical tool, and/or the same or a nominally identical machine tool, as those used in step a). The method could comprise: e) using the sensor-to-workpiece data calibration information to infer information (e.g. measurement data) about the workpiece from sensor data collected by a (e.g. the same or a nominally identical) sensor (configured to measure one or more aspects of the tool and/or machine tool) during said working. Step d) could be performed subsequent to, or before, steps b) and/or c).

As will be understood, a nominally identical workpiece could be a workpiece comprising the same material as the workpiece of step a). A nominally identical workpiece could be a workpiece having substantially the same dimensions as the workpiece of step a). A nominally identical workpiece could be a workpiece formed, or to be formed, to the same design specification (e.g. to the same computer-aided-design (CAD) specification). For example, a nominally identical workpiece could one which is machined or to be machined in accordance with the same machining instructions as the workpiece of step a).

The inferred information could comprise measurement data (e.g. absolute/quantified) measurement data. For example, the measurement data could comprise a dimensional measurement, such as bore diameter. The measurement data could comprise an error measurement. The measurement data could comprise surface roughness and/or surface waviness measurement data.

Optionally, the inferred information could comprise information about whether the part of the workpiece worked on is acceptable, e.g. conforms to predetermined tolerances. For example, rather than determining the absolute measurement data concerning the surface roughness, the method can comprise using the sensor-to-workpiece data calibration information and sensor data, obtained by at least one sensor (which is configured to measure/monitor one or more aspects/properties of a tool and/or machine tool), during the (e.g. subsequent) working of a workpiece, to make a decision about the workpiece and/or subsequent machining operations. For instance, the sensor-to-workpiece data calibration information and such sensor data could be used to automatically determine for a workpiece (e.g. the workpiece or a nominally identical workpiece), whether or not the machining process is behaving correctly and/or whether the part is likely to be out of tolerance. This information could be used as part of an automatic feedback control loop, e.g. such that adjustments to the machining of a workpiece could be made in real-time and/or such that adjustment(s) to subsequent machining steps of the same or nominally identical workpieces can be made. This could be, for example, based on thresholds generated/determined from the sensor-to-workpiece data calibration information.

The tool could comprise a stationary or a moving (e.g. rotating) tool. For example, the tool could be at least one of a: boring bar, milling tool, grinding tool, reaming tool, polishing tool or drilling tool.

As will be understood, calibration information could comprise a function, a model, a lookup table, and/or data. As explained above, the sensor-to-workpiece data calibration information could be referred to as sensor-to-workpiece data conversion information (or just sensor-calibration information).

Said aspects/properties of the tool and/or machine tool could comprise (in other words, the sensor data could comprise) at least one of: vibration, deflection, temperature and/or load.

Accordingly, the at least one sensor can comprise any sensor configured to measure at least one of vibration, deflection, temperature and/or load. For example, the at least one sensor can comprise at least one of: an accelerometer, temperature sensor and/or strain gauge (e.g. force sensor).

The measurement data and/or the inferred measurement data could comprise at least one of: position, dimension, surface roughness, surface waviness of the workpiece.

Working on (in other words "machining") the workpiece could comprise at least one of: cutting, drilling, grinding, polishing, turning, reaming and milling.

The machine tool could comprise the at least one sensor. For example, the machine tool's tool holder and/or spindle could comprise at least one sensor. Advantageously, the tool can comprise the at least one sensor. This can provide more accurate and repeatable sensor data. The tool could comprise a tool insert (or cutting edge) configured to interact with a workpiece so as to work the workpiece. The tool could comprise a tool body for holding the tool insert. Accordingly, the tool insert could be mounted to the machine tool via the tool body. The tool body could comprise the at least one sensor. Preferably, the at least one sensor is located toward the end of the tool body that is proximal the tool insert.

Step b) can be performed by a measurement device mounted on the machine tool. Optionally, step b) is performed by a measurement device mounted on a different positioning apparatus, for example on a coordinate measuring machine (CMM).

The measurement device can comprise a measurement probe. The probe could be configured for measuring dimensional properties of the workpiece. For example, the probe could be configured to measure the location (e.g. coordinate) of a particular point in a three-dimensional measurement volume. Optionally, the probe is configured to measure the surface roughness and/or waviness of the surface. The measurement probe could comprise a contact measurement probe. The probe could comprise a deflectable stylus. The probe could be configured to determine and output the extent of deflection of the stylus. Such probes are commonly known as scanning or analogue probes. Such probes are to be contrasted with touch-trigger probes which are configured to provide a "trigger" signal in response to the stylus deflecting beyond a particular/threshold amount. As will be understood, the measurement device is separate to the tool. Accordingly, the method could comprise swapping the tool and measurement device into and/or out of the tool holder (e.g. automatically from a storage rack/carousel). This could particularly be the case if the machine tool only has one tool holder.

The method can further comprise using the inferred information (e.g. measurement data). This could comprise using the inferred information (e.g. measurement data) to adjust subsequent working of the, or a subsequent nominally identical, workpiece. Such adjustment could comprise using the inferred information (e.g. measurement data) to automatically adjust subsequent working of the, or a subsequent nominally identical, workpiece.

Step c) can comprise adjusting prior determined sensor-to-workpiece data calibration information, based on the sensor data and the measurement data (e.g. to make it specific for the current workpiece/series of workpieces, and/or to compensate for changes in the tool, machine tool and/or operating environment). For example, such adjusting can comprise offsetting prior determined sensor-to-workpiece data calibration information. Such prior determined sensor-to-workpiece data calibration information could be generic sensor-to-workpiece data calibration information, e.g. generic for the tool (and optionally machine tool, e.g. for the tool/machine tool combination) but not specific to a workpiece. Accordingly, step c) could comprise adjusting/updating the generic sensor-to-workpiece data calibration information (based on the sensor and measurement data) to determine sensor-to-workpiece data calibration information which is specific/peculiar to the particular workpiece, tool and machine tool combination. Accordingly, the method could comprise determining generic sensor-to-workpiece data calibration information for a particular tool (and optionally, machine tool) combination, and then performing steps a) to c) in order to update/adjust the generic calibration information.

Step a) can comprise causing the tool to work on a workpiece in a way which causes the tool to experience different machining properties (e.g. different loads, different amounts of vibration) at different points in space and/or time. Step b) can comprise a measurement device inspecting the part(s) of the workpiece that have been subject to such different machining properties. Accordingly, step c) can comprise calculating sensor-to-workpiece data calibration information from the sensor data and the measurement data which relate to different machining properties.

In other words, step a) can comprise i) causing a tool mounted on a machine tool to work on a workpiece in accordance with first machining parameters and collecting sensor data obtained by at least one sensor during said working in accordance with first machining parameters, and ii) causing a tool mounted on a machine tool to work on a workpiece in accordance with second machining parameters (different to the first) and collecting sensor data obtained by at least one sensor during said working in accordance with second machining parameters. The first and second machining parameters can be configured differently so as to cause the tool to experience different properties (e.g. different loads, different amounts of vibration) during working of the workpiece. Step b) can comprise inspecting the part/surface of workpiece that has been formed by step i) and ii) (e.g. by at least one measurement device). Step c) can comprise calculating sensor-to-workpiece data calibration information from the sensor data obtained at step i) and ii) and the measurement data obtained at step b). As will be understood, step b) could be performed in once after both steps i) and ii) have been performed (in which case steps i) and ii) can be performed on different locations on the workpiece). Optionally, step i) and ii) could be performed on the same part of the workpiece, in which the step b) is performed after step i) and before step ii) so as to inspect the part/surface of workpiece that has been formed by step i) and then step b) is repeated again after step ii) in order to inspect the part/surface of workpiece that has been formed by step ii).

The sensor-to-workpiece data calibration information could be workpiece-specific. In other words, the sensor-to-workpiece data calibration information could be determined for the workpiece worked on at step a) and nominally identical workpieces (i.e. for workpieces in a series of nominally identical workpieces). Accordingly, different sensor-calibration information could be determined for different/non-nominally identical workpieces. The sensor-to-workpiece data calibration information could be determined for (e.g. could be peculiar to) the specific tool and machine tool combination. In particular, the sensor-to-workpiece data calibration information could be determined for (e.g. could be peculiar to) the specific workpiece, tool and machine tool combination.

This application describes a method of inferring, from sensor data which relates to one or more aspects/properties of a machine tool and/or a tool mounted thereon, information about a workpiece worked on by the tool mounted on the machine tool apparatus. The method can comprise (in any suitable order): a) determining sensor-calibration information from: i) actual measurement data of a part of a workpiece that has been worked on by a tool, and ii) sensor data relating to one or more properties of the machine tool and/or a tool mounted thereon, obtained during the working of the part measured in i) by the tool. The method can also comprise: b) taking sensor data relating to one or more properties of the machine tool and/or a tool mounted thereon obtained whilst a workpiece was being worked on by a tool mounted on a machine tool apparatus. The method can also comprise: c) using the sensor-calibration information to obtain inferred information (e.g. measurement data) about the workpiece from the sensor data obtained during step b).

According to another aspect of the invention, there is provided a method of inferring measurement data about a workpiece worked on by a tool mounted on a machine tool, the method comprising, in any suitable order: a) taking sensor data obtained by at least one sensor, which is configured to measure one or more aspects of the tool and/or machine tool, whilst the workpiece was being worked on by the tool; and b) using sensor-calibration information configured for the particular tool and workpiece combination, to infer information about the workpiece from said sensor data.

As will be understood, any of the above described methods can be computer implemented. Accordingly, according to another aspect of the invention, there is provided a computer program product, comprising computer program code, which when executed by a computer, causes the computer to perform any of the above described methods. According to another aspect of the invention, there is provided a computer readable medium, bearing computer program code as described above.

According to another aspect of the invention, there is provided a machine tool apparatus, comprising a tool for working a workpiece, at least one sensor which is configured to measure one or more aspects of the tool and/or machine tool during said working of a workpiece, and a controller which is configured (e.g. with computer program code) to cause the machine tool apparatus to perform any of the above described methods.

Embodiments of the invention will now be described, by way of example only, with reference to the following drawings in which.

Figure 1:
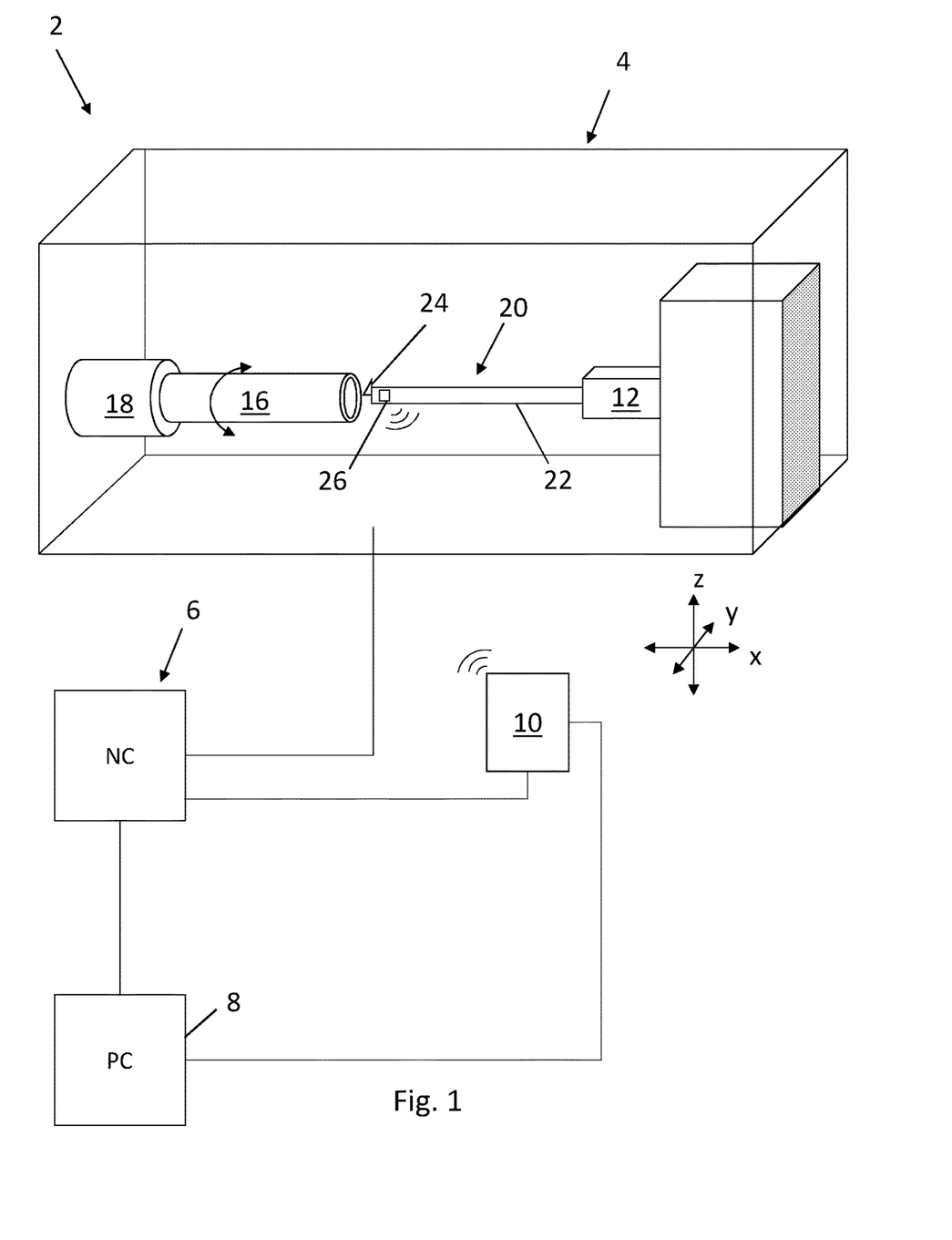
FIG. 1 schematically illustrates a machine tool apparatus on which a tool for working a workpiece is mounted.

With reference to FIG. 1 there is shown a machine tool apparatus 2 comprising a machine tool 4, a numerical controller 6 (NC) (for example, a computer numerical controller or "CNC"), a PC 8 and a transmitter/receiver interface 10. The machine tool 4 comprises a tool holder 12 which holds and moves a tool 20 relative to a workpiece 16 which is mounted in a spindle 18. The NC 6 controls rotation of the spindle 18 and x, y, z movement of the tool holder 12 within the work area of the machine tool using motors and encoders (not shown) or the like. The NC 6 can be programmed with a machining operation, for example via the PC 8.

In the embodiment described, the tool 20 is a boring bar, and comprises a tool body 22 and a tool insert 24, (such as a cutting insert, which is configured to interact with (e.g. cut) the workpiece so as to process the workpiece. The boring bar 20, in particular the tool body 22, comprises at least one sensor 26 for measuring/monitoring one or more aspects/properties of the tool during working of a workpiece. For example, in this embodiment, the tool body comprises an accelerometer (for measuring/monitoring vibrations), a temperature sensor, and a strain gauge which in the figure are collectively illustrated by box 26. As shown, the sensors 26 are located at the end of the tool body 22 proximal the tool insert 24. In alternative embodiments, one or more sensors for measuring/monitoring one or more aspects/properties of the machine tool during working of a workpiece, can be provided, e.g. in the tool holder 12 and/or spindle 18 (in addition to, or instead of, the sensor(s) in the tool 20.

The workpiece 16 can be worked on by the tool 20, by moving the tool insert 24 into the workpiece 16 whilst it is being turned by the spindle 18. Simultaneously, data from the at least one sensor 26 in the tool body 22 can be obtained. For example, data relating to at least one of temperature, vibration, load and deflection of the tool can be obtained. Such data can be transmitted to an external device, e.g. to the NC 6 and/or PC 8, for example via a wireless link and interface unit 10. For example, the at least one sensor 26 could communicate with an interface unit 10 via the Bluetooth wireless technology standard. In the embodiment described, the data is streamed instantaneously and continuously. However, as will be understood, this need not necessarily be the case. For example, the data could be transmitted, at intervals (regular or irregular), or only when requested, for example. In other example embodiments, data from the at least one sensor 26 could be stored locally within memory in the tool 20, and downloaded to the NC 6 and/or PC 8 at a later time, e.g. subsequent to working of the tool, e.g. via a wired or wireless link.

Figure 2:
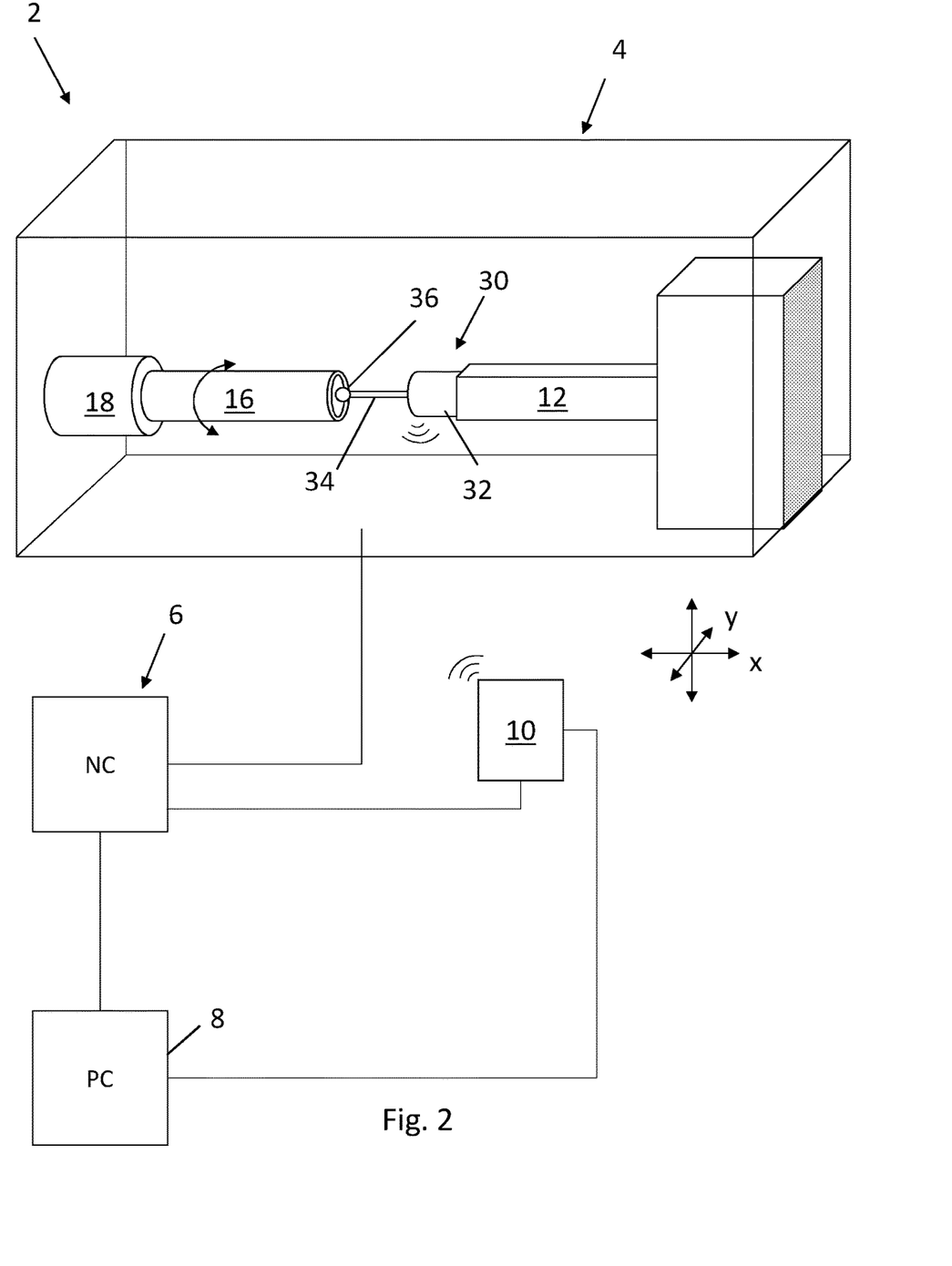
FIG. 2 schematically illustrates the machine tool apparatus of FIG. 1, but on which a measurement probe has been mounted on the machine tool in place of the tool.

FIG. 2 illustrates that a measurement probe 30 can be loaded in the tool holder 12 of the machine tool 4 in place of the tool 20 (FIG. 1). In this embodiment, the probe 30 is a contact probe, comprising a body 32 which is mounted to the tool holder 12, a stylus 34 extending from the body 32 and a stylus tip 36 at the end of the stylus 34 distal the body 32. In the described embodiment, the stylus 34 can deflect relative to the body 32 (e.g. when the stylus tip 36 touches a surface), and such deflections can be detected by sensors in the body 32. In particular, in the embodiment described the probe is a scanning probe (also known in the art as an analogue probe) in that the extent/amount/degree of the deflection of the stylus from a rest position can be sensed and reported by the probe 30 (in contrast to a touch-trigger probe which only reports when the stylus has deflected, e.g. by a predetermined threshold amount). Such scanning probes for machine tools are known; for instance the OSP60 probe with SPRINT™ technology available from Renishaw plc. As will be understood, other probes and other technologies could be used.

Accordingly, the part of the workpiece worked on can be measured by bringing the stylus tip 36 into contact with the surface of the workpiece 16. Stylus deflection data from the probe 30 can be streamed instantaneously and continuously to the NC 6 and/or PC 8, for example wirelessly, via an interface 10. As per the tool described above, this could be via Bluetooth connection. As will be understood, other techniques could be used to transfer stylus deflection data. For example, the data could be transmitted at intervals (regular or irregular), or only when requested, for example. In other example embodiments, stylus deflection data could be stored locally within memory in the probe 30, and downloaded to the NC 6 and/or PC 8 at a later time, e.g. via a wired or wireless link.

If desired, data from the probe 30 could be combined with machine tool position data; for example, combined with data concerning the relative position of the probe 30 and workpiece 16. For example, data from the probe 30 could be combined with tool holder 12 position data, which could be obtained from encoders (not shown) which monitor the position of the tool holder 12 in any or all of the x, y and z axes.

Accordingly, as will be understood, the measurement data about the part of the workpiece worked on could be the raw data obtained/output by the probe 30, or could be data obtained by processing the raw data obtained/output by the probe 30 (e.g. by combining it with other data, such as data about the position of the tool holder 12).

As will be understood, measurement probes other than scanning stylus deflection probes can be used. For example a touch-trigger measurement probe or a surface-finish probe could be used. Optionally, a non-contact probe could be used. Optionally, the part does not need to be measured on the same machine. For example, the part could be removed from the machine tool and measured on a coordinate measuring machine (CMM) or the like.

Figure 3:
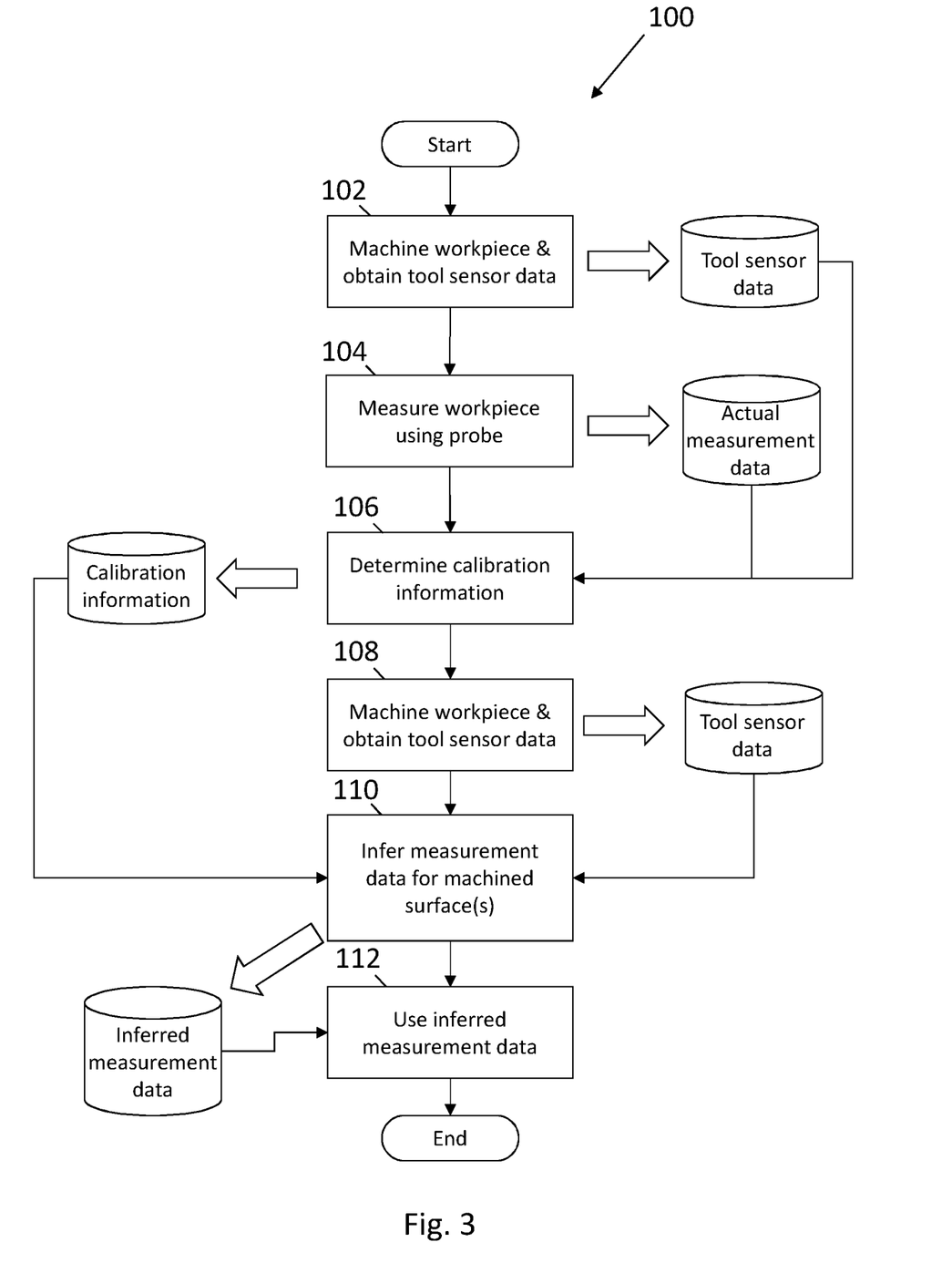
FIG. 3 is a flow chart of an example process in accordance with the present invention.

An example process 100 according to the present invention is shown in FIG. 3.

The example process 100 begins at step 102 at which the workpiece 16 is worked on by the tool 20, and data from the tool's 20 at least one sensor 26 is obtained during the working of the workpiece. As schematically illustrated in FIG. 3, the tool sensor data can be stored in memory (e.g. in the PC 8) for subsequent use. As will be understood, the data could be stored elsewhere, for example in the NC 6, interface 10, or elsewhere, such as in network storage or in the cloud. At step 104, the part of the workpiece 16 worked on by the tool 20 is then measured using the measurement probe 30 to obtain measurement data (e.g. dimensional and/or surface roughness/waviness data) about the part. As schematically illustrated in FIG. 3, the measurement data can be stored in memory for subsequent use.

Figure 4A:
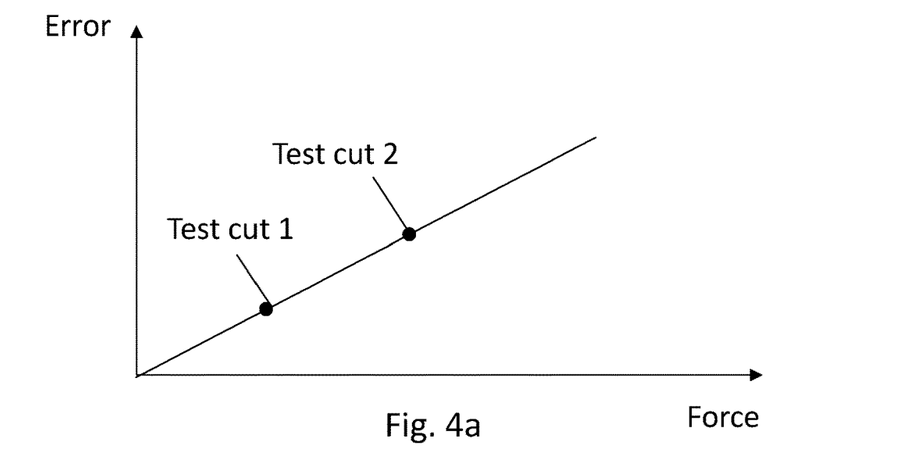
FIGS. 4a to c are graphs illustrating possible calibration models.

At step 106, the tool sensor data and the measurement data obtained at steps 102 and 104 are used to determine sensor-to-workpiece data calibration information. This could be achieved in a number of different ways. For example, a model which models the relationship between i) a particular property of the tool (such as load on the tool, measured by a strain-gauge for example) and ii) the error in a dimension of the part (for example the diameter of a bore), can be determined from one or more test cuts and measurements of the workpiece. Such a model could be in the form of a function or a lookup table, for example. FIG. 4a is a graph illustrating a model determined from two different test bore-cuts which were performed at two different loads, and from the error in the diameter of the bore formed by those two test cuts. These results are shown plotted on the graph of FIG. 4a. As shown, a model (e.g. a function) can be determined which fits a straight-line through the results of the two test cuts. This model could be (or form the basis of) a calibration model for the workpiece. Accordingly, for subsequent cuts on the workpiece (or on nominally identical workpieces), the error in the diameter of the bore (and hence the actual dimension of the bore) can be inferred from the load measured during the cutting process.

In this embodiment, two test cuts were obtained. However, as well be understood, more or fewer test cuts could be obtained. For example, if more than two test cuts are obtained, the calibration model could be based on a (straight or curved) line of best-fit through the measurements obtained from the different test cuts.

Figure 4B:
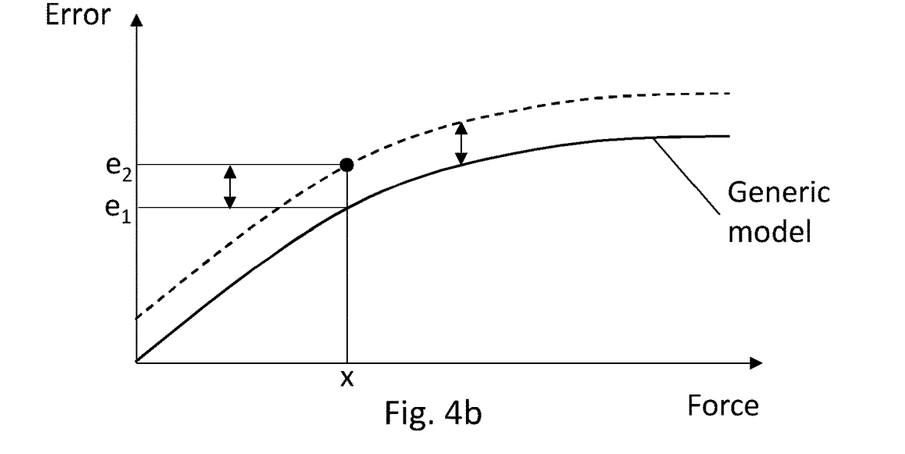

In an alternative embodiment, it might be that generic sensor-to-workpiece data calibration information for the tool (and optionally machine tool, e.g. for the tool/machine tool combination) has already been obtained. For example, as illustrated by the solid line in FIG. 4b, it might be that a generic model of the relationship between load and machining error has already been determined for the tool (and optionally machine tool, e.g. for the tool/machine tool combination). Nevertheless, the inventors have found that use of such a generic model will not necessarily provide accurate measurements for any given workpiece. Accordingly, the inventors have found that there can be significant benefit of performing one or more test cuts on the (or on a nominally identical) workpiece, measuring the part(s) that was (were) cut, and determining a calibration model/function for that workpiece (and for subsequent workpieces in a series of nominally identical workpieces). Accordingly, the sensor-to-workpiece data calibration information can then be workpiece-specific. For instance, this could comprise performing just one test cut, and based thereon, adapting the generic model. For example, as illustrated in FIG. 4b, it could be that it is determined that for a measured load of "x" during machining of a bore, the actual error in the diameter of the bore is $e_2$, not $e_1$ as was predicted by the generic model. This difference in error could be assumed to be constant, and so as illustrated by the dashed-line in the graph of FIG. 4b, an adapted calibration model could be determined by offsetting the generic model by the difference between $e_2$ and $e_1$. As will be understood, more than one test cut and measurement thereof can be performed if desired, which could provide more accurate offset information.

Figure 4C:
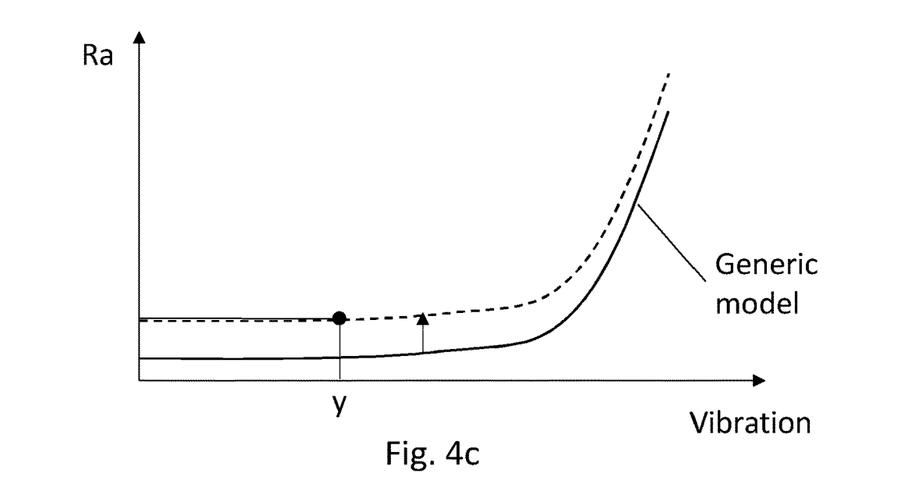

Likewise, as illustrated by FIG. 4c, the same approach could be taken for properties of the other than load. For example, a generic model of measured vibration vs surface roughness (Ra) can be adapted based on an actual reading of surface roughness experienced at a particular measured level of vibration "y".

The calibration information (e.g. a function, model, data or other appropriate information) can then be stored in memory (e.g. in the PC) for subsequent use.

At some subsequent point in time, the workpiece (or for example, a nominally identical workpiece) is worked on again by the tool (or for example a nominally identical tool), represented by step 108 in the process 100. As illustrated in FIG. 3, tool sensor data from the tool's 20 at least one sensor 26 is obtained during the working of the workpiece and stored in memory (e.g. in the PC) for subsequent use.

At step 110, the calibration information obtained at step 106 and the tool sensor data obtained at step 108 are used to infer measurement data about the part of the workpiece worked on at step 108. For example, in the case of forming a bore, and in connection with FIGS. 4a and 4b, this can comprise using the model determined at step 106 to look up the inferred error in diameter based on the load applied to the tool as measured by the sensor 26 during the machining process of step 108. Alternatively, or additionally, in connection with FIG. 4c, this can comprise using the model determined at step 106 to determine the surface roughness of the part based on vibration as measured by the sensor 26 during the machining process of step 108. Once determined, this inferred measurement data can then be stored in memory (e.g. in the PC) for subsequent use, e.g. a step 112. For example, such use of the inferred measurement data can comprise at least one of determining: whether to accept or reject a workpiece; how to adjust subsequent working of the workpiece either in real-time or during a subsequent processing step; and/or stop the process.

Accordingly, with the technique of the present invention, measurement data about the part of the workpiece worked on can be determined without having to actually directly measure the part with a measurement tool.

As will be understood, rather than inferring measurement data for a machined surface, the method can comprise using the calibration information determined at step 106 to determine process control parameters for use in controlling subsequent machining steps (of the same or nominally identical workpieces). For example, the method can comprise determining a threshold vibration level, above which corrective action should be taken.

As will be understood, references herein to storing data in memory can comprise storing data in a permanent storage and/or transitory memory e.g. (random-access memory "RAM"). Furthermore, the above mentioned storing steps can be optional. For example, the inferred measurement data could be transmitted to an external device, and/or used immediately (e.g. by the NC 6 to make a decision) without being stored in a storage device.

As will be understood, although one interface 10 is shown common to the NC 6 and PC 8, they could each have their own separate interface 10. Furthermore, such an interface could be embedded within the NC 6 and/or PC 8, rather than being separate as depicted in the Figures.

In the above described embodiment, the measurement probe 30 is mounted in the tool holder 12 in place of the tool 20. However, as will be understood, in alternative embodiments, the measurement probe could be mounted on a separate tool holder, or other part, of the machine tool. In this case, it would not be necessary to swap the tool for the measurement probe.

In the above described embodiment, the same part, same tool and same machine are used in all steps. However, this need not necessarily be the case. For example, the workpiece, tool and/or machine tool used at steps 102 and 104 could be different (albeit nominally identical), to the workpiece, tool and/or machine tool used at step 108. For example, in one embodiment, the calibration information could be obtained on a different machine tool. For example, steps 102 and 104 could be performed on a different machine tool to step 108. In another example embodiment, steps 102 and 108 could be performed on the same machine tool, but step 104 could be obtained on a different apparatus, for example a different machine tool or a dedicated measuring apparatus such as a coordinate measuring machine (CMM).

As will be understood, in alternative embodiments, tools other than boring bars can be used. For example, the tool could comprise a drill, grinding wheel, or a milling, reaming or milling tool.

As will be understood, in alternative embodiments, relative movement in any or all of the x, y and z dimensions could be provided by movement of the spindle 18 instead of or as well as the tool holder 12. Furthermore, movement might be restricted to fewer dimensions, e.g. only x, and/or y. Further still, the embodiment described comprises a cartesian machine tool, whereas will be understood this need not necessarily be the case and could be instance be a non-cartesian machine tool. Further still, as will be understood, although the present invention is shown in conjunction with a lathe machine tool, the invention could be used with many other types of machine tool apparatus and machining centres, such as milling machine tool apparatus (e.g. in which the tool is held in a spindle which can be moved). Accordingly, the invention could be used with embodiments in which the tool is rotating and the part is held stationary.

As will be understood, steps 102 and 104 could be repeated, for example on different (e.g. nominally identical) workpieces, from which the calibration information is obtained at step 106.

In the above described embodiment, the method comprises performing an initial test cut and measurement to determine the calibration information before subsequent machining takes place. Nevertheless, as will be understood, this need not necessarily be the case, and machining operations for which information is inferred could have taken place before the calibration information is determined. For example, the method can comprise performing multiple machining operations on one workpiece (or on a plurality of nominally workpieces), measuring just one (or just some of the) part(s) which has (have) been machined (or measuring just one or some of the workpieces for example) to determine the calibration information therefrom, and then using the calibration information to infer information about the other parts of the workpiece (or about the other workpieces) which have already been machined.

The invention claimed is:

1. A method comprising:
   a) causing a tool mounted on a machine tool to work on a workpiece, wherein at least one sensor, which is configured to measure one or more aspects of the tool and/or the machine tool, collects sensor data during the working;
   b) a measurement device inspecting a part of the workpiece that was worked on at step a) to obtain measurement data; and
   c) calculating sensor-to-workpiece data calibration information from the sensor data and the measurement data.

2. The method as claimed in claim 1, further comprising using the sensor-to-workpiece data calibration information and the sensor data collected during the working of the workpiece to infer information about the workpiece.

3. The method as claimed in claim 2, wherein the information inferred about the workpiece from the sensor data comprises measurement data.

4. The method as claimed in claim 2, further comprising using the inferred information about the workpiece to adjust subsequent working of the, or a subsequent nominally identical, workpiece.

5. The method as claimed in claim 2, wherein the measurement data and/or the inferred information comprises at least one of: position, dimension, surface roughness, surface waviness of the workpiece.

6. The method as claimed in claim 1,
wherein the workpiece of step a) is one of a series of nominally identical workpieces to be worked, and
wherein for at least one further workpiece in the series, information about the at least one further workpiece is inferred from the sensor-to-workpiece data calibration information and sensor data obtained during its working of the at least one further workpiece.

7. The method as claimed in claim 1, wherein the method comprises:
d) working the same or a nominally identical workpiece, using the same or a nominally identical tool and the same or a nominally identical machine tool as those used in step a), and e) using the sensor-to-workpiece data calibration information to infer information about the workpiece from sensor data, which was collected during step d) by the same or a nominally identical sensor as that used in step a).

8. The method as claimed in claim 1, wherein the sensor data comprises at least one of: vibration, deflection and/or load.

9. The method as claimed in claim 1, wherein working on the workpiece comprises at least one of: cutting, drilling, grinding, polishing, turning, reaming and milling.

10. The method as claimed in claim 1, wherein the tool comprises the at least one sensor.

11. The method as claimed in claim 10,
wherein the tool comprises a tool insert and a tool body via which the tool insert is mounted to the machine tool apparatus, and
wherein the tool body comprises the at least one sensor.

12. The method as claimed in 11, wherein the at least one sensor is located toward an end of the tool holder that is proximal the tool insert.

13. The method as claimed in claim 1, wherein step b) is performed by a measurement device mounted on the machine tool.

14. The method as claimed in claim 1, wherein the measurement device comprises a measurement probe for measuring dimensional properties of the workpiece.

15. The method as claimed in claim 1, wherein step c) comprises adjusting prior determined sensor-to-workpiece data calibration information based on the sensor data and the measurement data.

16. A method of inferring measurement data about a workpiece worked on by a tool mounted on a machine tool, the method comprising, in any suitable order:
a) taking sensor data obtained by at least one sensor, the sensor data relating to one or more properties of the tool and/or the machine tool whilst the workpiece was being worked on by the tool; and
b) using sensor-to-workpiece data calibration information, which is for a particular combination of the tool, the workpiece, and the machine tool, to infer information about the workpiece from the sensor data.

* * * * *